United States Patent
Peterson

(10) Patent No.: US 9,410,576 B2
(45) Date of Patent: Aug. 9, 2016

(54) COMPACT BEARING ASSEMBLIES INCLUDING SUPERHARD BEARING SURFACES, BEARING APPARATUSES, AND METHODS OF USE

(71) Applicant: US Synthetic Corporation, Orem, UT (US)

(72) Inventor: S. Barrett Peterson, Orem, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 14/097,059

(22) Filed: Dec. 4, 2013

(65) Prior Publication Data

US 2015/0152915 A1    Jun. 4, 2015

(51) Int. Cl.
| | |
|---|---|
| *F16C 17/10* | (2006.01) |
| *F16C 33/04* | (2006.01) |
| *E21B 4/00* | (2006.01) |
| *F16C 32/06* | (2006.01) |
| *F16C 17/02* | (2006.01) |
| *F16C 17/04* | (2006.01) |
| *F16C 17/26* | (2006.01) |
| *F16C 33/10* | (2006.01) |

(Continued)

(52) U.S. Cl.
CPC .............. *F16C 33/043* (2013.01); *F01D 25/16* (2013.01); *F02C 7/06* (2013.01); *F16C 17/02* (2013.01); *F16C 17/026* (2013.01); *F16C 17/045* (2013.01); *F16C 17/107* (2013.01); *F16C 17/26* (2013.01); *F16C 32/0633* (2013.01); *F16C 33/107* (2013.01); *E21B 4/003* (2013.01); *F05D 2300/605* (2013.01); *F16C 2206/04* (2013.01); *F16C 2360/23* (2013.01)

(58) Field of Classification Search
CPC .......... E21B 4/003; E21B 10/22; E21B 10/23; F16C 33/26; F16C 33/043; F16C 32/0633; F16C 17/02; F16C 17/107; F16C 2352/00; F16C 2206/04
USPC ........................................ 175/371; 384/92–96
See application file for complete search history.

(56) References Cited

U.S. PATENT DOCUMENTS

| | | | |
|---|---|---|---|
| 2,602,714 A | 7/1952 | Wheildon, Jr. et al. | |
| 4,270,812 A * | 6/1981 | Thomas | 384/95 |
| 7,866,418 B2 | 1/2011 | Bertagnolli et al. | |

(Continued)

FOREIGN PATENT DOCUMENTS

| | | |
|---|---|---|
| EP | 0392500 | 10/1990 |
| GB | 2054064 | 2/1981 |

OTHER PUBLICATIONS

U.S. Appl. No. 13/761,944, filed Feb. 7, 2013, Peterson et al.

(Continued)

*Primary Examiner* — Alan B Waits
(74) *Attorney, Agent, or Firm* — Dorsey & Whitney LLP

(57) ABSTRACT

Embodiments of the invention are directed to compact bearing assemblies configured to operate in small spaces and/or in harsh environments, bearing apparatuses including such bearing assemblies, and method of operating such bearing assemblies and apparatuses. For instance, one or more compact bearing assemblies may at least partially rotatably secure a shaft of a power generation unit to a housing thereof. Also, a first compact bearing assembly may connect or couple to the shaft and may rotatably engage a second compact bearing assembly, which may be connected or otherwise secured to the housing.

23 Claims, 11 Drawing Sheets

(51) Int. Cl.
*F01D 25/16* (2006.01)
*F02C 7/06* (2006.01)

(56) References Cited

U.S. PATENT DOCUMENTS

| 7,998,573 | B2 | 8/2011 | Qian et al. |
| 8,034,136 | B2 | 10/2011 | Sani |
| 8,236,074 | B1 | 8/2012 | Bertagnolli et al. |
| 2005/0152627 | A1 | 7/2005 | Ku et al. |
| 2013/0156357 | A1 | 6/2013 | Peterson et al. |

OTHER PUBLICATIONS

International Search Report and Written Opinion from International Application No. PCT/US2014/067711 mailed Feb. 3, 2015.

* cited by examiner

COMPACT BEARING ASSEMBLIES INCLUDING SUPERHARD BEARING SURFACES, BEARING APPARATUSES, AND METHODS OF USE

BACKGROUND

Subterranean drilling systems can employ various tools that require electrical power. In some instances, a drilling system includes a power generation unit. Fluid, such as drilling fluid, may flow through a turbine of the power generation unit, thereby producing rotation of a shaft, which may be converted into electrical power (e.g., the power generation unit may drive an alternator). Bearing apparatuses (e.g., thrust, radial, tapered, and other types of bearings) also may be operably coupled to the shaft and may assist in maintaining the shaft in a substantially stationary lateral and/or axial position, for instance, relative to a housing, while allowing the shaft to rotate.

A typical bearing apparatus includes a stator that does not rotate and a rotor that is attached to the shaft and rotates with the shaft. The operational lifetime of the bearing apparatuses often determines the useful life of the power generation unit as well as of the subterranean drilling system. Therefore, manufacturers and users of subterranean drilling systems and power generation units continue to seek improved bearing apparatuses to extend the useful life of such bearing apparatuses.

SUMMARY

Embodiments of the invention are directed to compact bearing assemblies configured to operate in small spaces and/or in harsh environments, bearing apparatuses including such bearing assemblies, and methods of operating such bearing assemblies and apparatuses. For instance, one or more compact bearing assemblies may at least partially rotatably secure a shaft of a power generation unit to a housing thereof. In an embodiment, a first compact bearing assembly may connect or couple to the shaft and may rotatably engage a second compact bearing assembly, which may be connected or otherwise secured to the housing. Furthermore, when engaged with one another, the first and second compact bearing assemblies may have limited or no lateral movement relative to one another. Hence, a bearing apparatus that may include the first and second bearing assemblies may rotatably secure the shaft to the housing, while limiting lateral movement of the shaft relative to the housing.

An embodiment includes a bearing apparatus including a first bearing assembly and a second bearing assembly. The first bearing assembly includes a first support structure. The first bearing assembly further includes a first superhard body secured to the first support structure and protruding above a top surface thereof and defining a convex radial-bearing surface. The second bearing assembly includes a second superhard body secured within the recess. In addition, the second superhard body includes an opening defined by a concave radial-bearing surface that is sized and configured to rotatably engage the first radial-bearing surface.

Embodiments also include a power generation unit including a housing and a first bearing assembly attached to the housing. The first radial bearing assembly includes a first single superhard body that defines a first radial-bearing surface. The power generation unit also includes a shaft rotatably secured within the housing in a manner that flow of fluid through the power generation unit produces rotation of the shaft. Furthermore, the power generation unit includes a second bearing assembly attached to the shaft. The second bearing assembly includes a second single superhard body that defines a second radial-bearing surface, the second radial-bearing surface being rotatably engaged with the first radial-bearing surface. In addition, the power generation unit includes an alternator operably connected to the shaft.

Another embodiment is directed to a method of rotating a shaft within a housing. The method includes attaching a first bearing assembly to the shaft and attaching a second bearing assembly to the housing. Additionally, the method includes positioning a first radial-bearing surface of the first bearing assembly inside an opening defined by a second radial-bearing surface of the second bearing assembly. Moreover, one or more of the first radial-bearing surface or the second radial-bearing surface include superhard material. The method also includes forming a fluid film between the first radial-bearing surface and the second radial-bearing surface during the rotation of the shaft within the housing, thereby producing hydrodynamic operation between the first radial-bearing surface and the second radial-bearing surface.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1A:
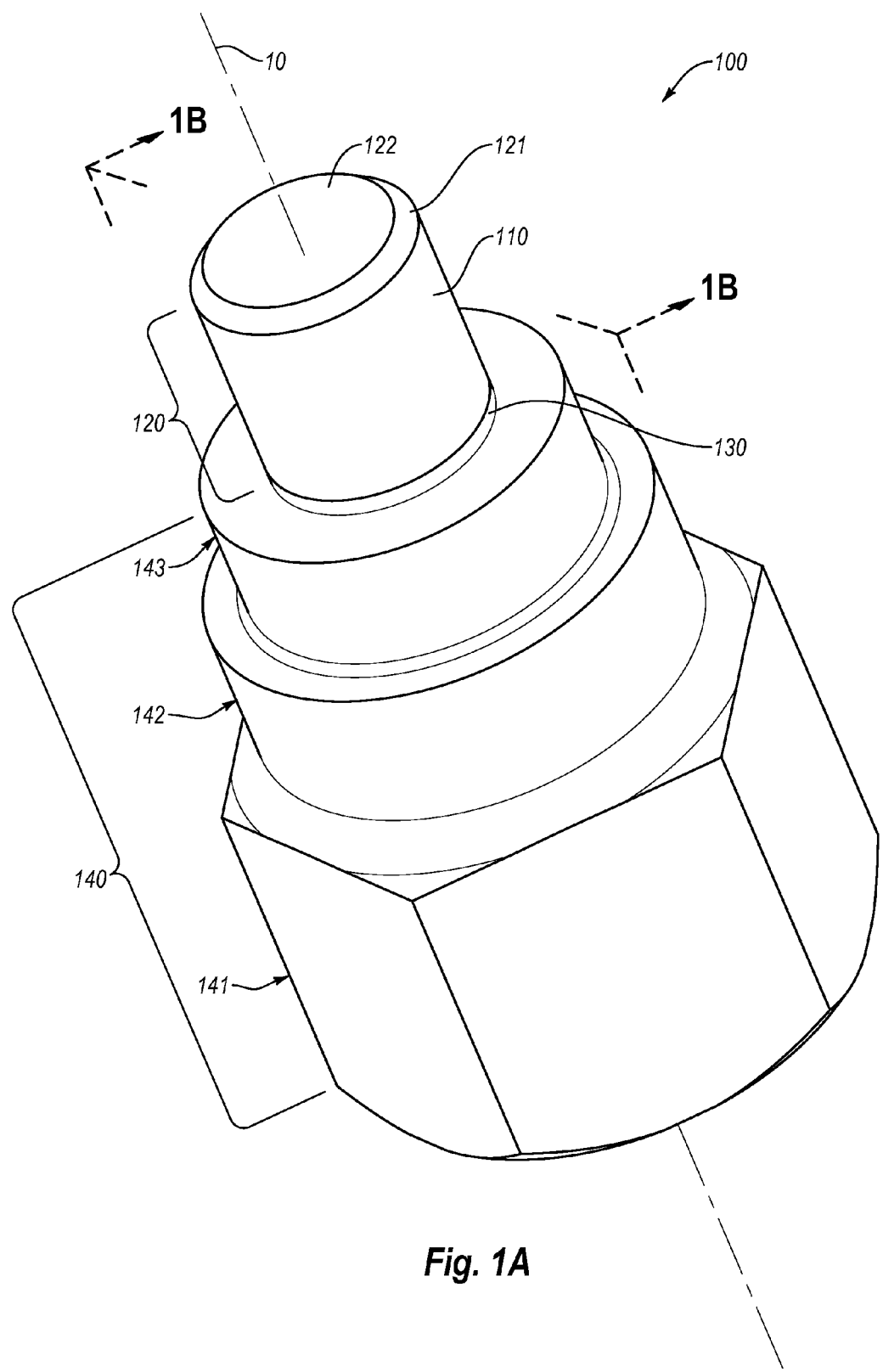
FIG. 1A is an isometric view of a first bearing assembly according to an embodiment.

Embodiments of the invention are directed to compact bearing assemblies configured to operate in small spaces and/or in harsh environments, bearing apparatuses including such bearing assemblies, and method of operating such bearing assemblies and apparatuses. For instance, one or more compact bearing assemblies may at least partially rotatably secure a shaft of a power generation unit to a housing thereof. In an embodiment, a first compact bearing assembly may connect or couple to the shaft and may rotatably engage a second compact bearing assembly, which may be connected or otherwise secured to the housing. Furthermore, when engaged with one another, the first and second compact bearing assemblies may have limited or no lateral movement relative to one another. Hence, a bearing apparatus that may include the first and second bearing assemblies may rotatably secure the shaft to the housing, while limiting lateral movement of the shaft relative to the housing.

In an embodiment, one of the first bearing assembly and the second bearing assembly may include a protrusion that may have a convex substantially cylindrical bearing surface, while the other of the first and second bearing assemblies may include an opening defined by a concave substantially cylindrical bearing surface that may rotatably engage the protrusion. As such, the first bearing assembly may rotate relative to the second bearing assembly, as described above. In additional or alternative embodiments, the first and/or the second bearing assembly may include superhard material that may form or define at least a portion of the bearing surfaces thereof. For example, the first and/or second bearing assembly may include a superhard body bonded to a substrate. The respective superhard bodies may include superhard material that forms/defines bearing surfaces of the first and second bearing assemblies.

In some embodiments, the first bearing assembly may include a superhard body that protrudes away from the support structure, thereby forming a protrusion with a convex bearing surface that may enter and/or engage the second bearing assembly. For example, the second bearing assembly may include an interior surface that may form/define a concave bearing surface of the second bearing assembly. For example, the protrusion of the first bearing assembly may enter an opening in the second bearing assembly and may engage the bearing surface of the second bearing assembly.

Furthermore, as noted above, in an embodiment, the respective bearing surfaces of the first and second bearing assemblies may be formed/defined by superhard material (e.g., superhard material of respective superhard bodies). As such, the bearing surface defined or formed by the opening in the second bearing assembly may include superhard material. In an embodiment, the superhard material may be a body of superhard material mounted on or within the support structure. Such superhard body may form a hole or an opening that may rotatably at least partially engage the protrusion of the first bearing assembly.

Also, in some embodiments, the first bearing assembly may be a rotor, while the second bearing assembly may be a stator (e.g., the second bearing assembly may be substantially stationary relative to a housing or other machine component, while the first bearing assembly may rotate together with the shaft) or vice versa. In any event, at least a portion of a protrusion of the first bearing assembly may rotatably at least partially engage an opening in the second bearing assembly in a manner that allows the first and second bearing assemblies to rotate relative to each other, while preventing or limiting lateral movement thereof.

Figure 1B:
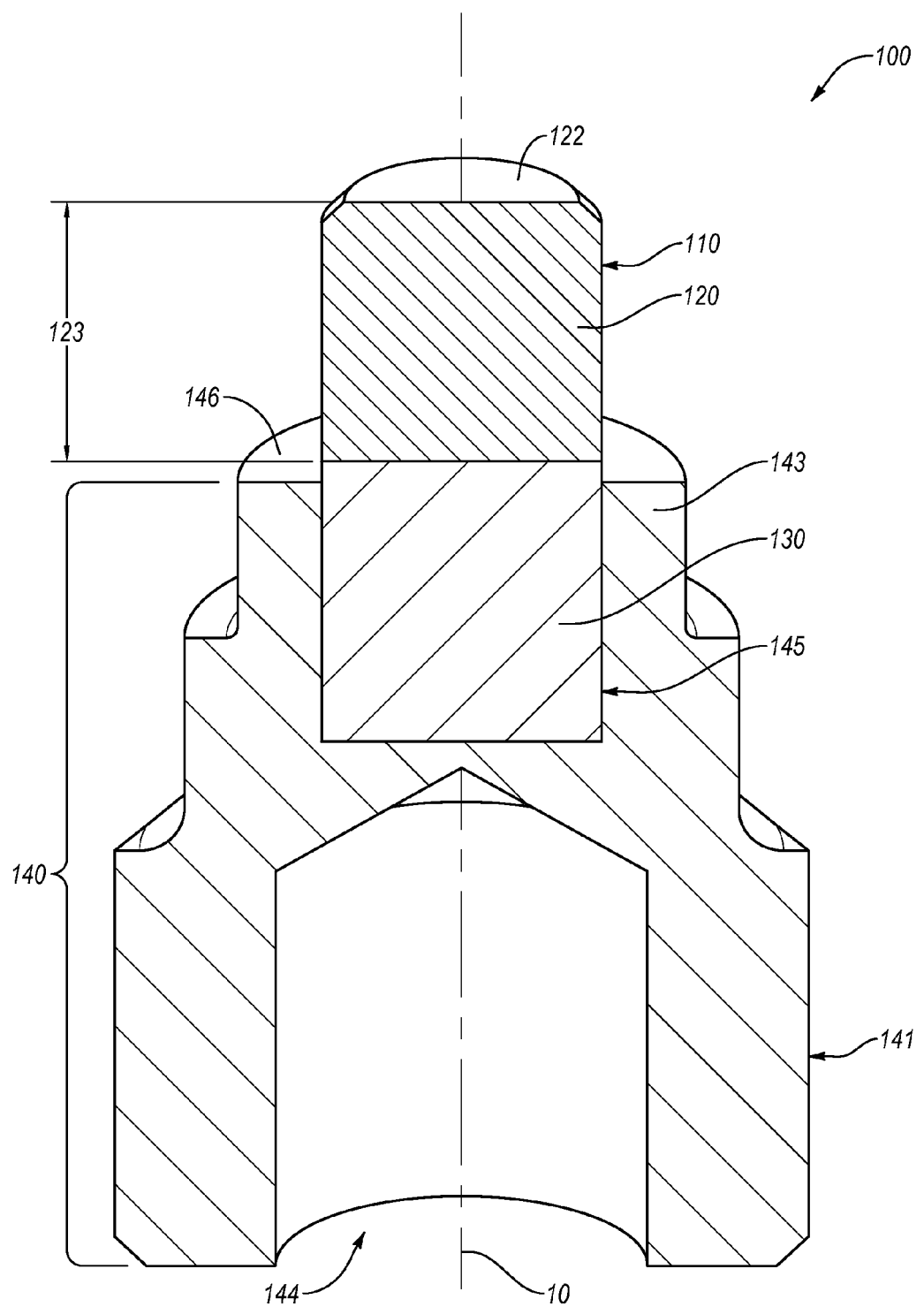
FIG. 1B is a cross-sectional view of the first bearing assembly of FIG. 1A.
Figure 1C:
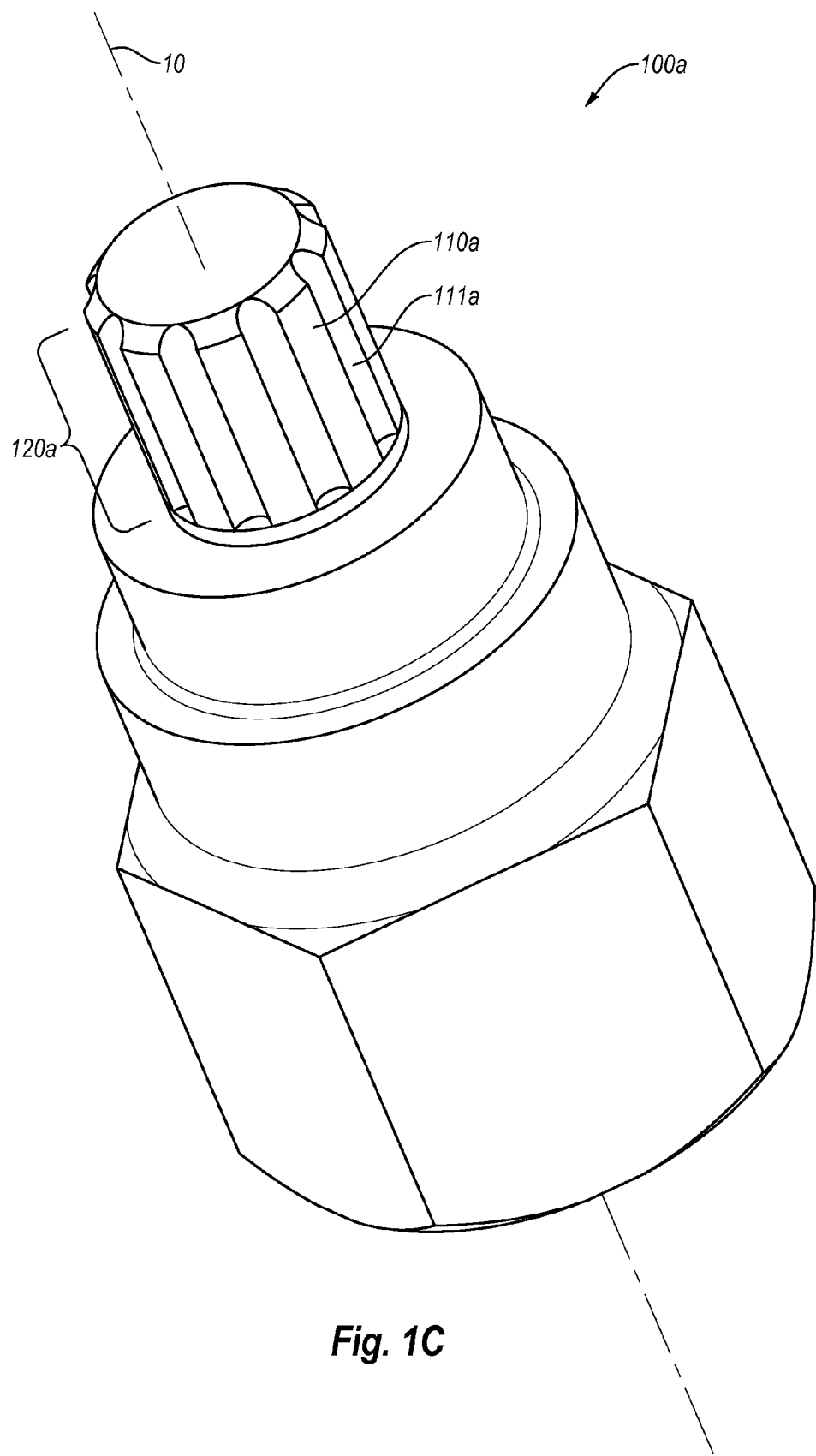
FIG. 1C is an isometric view of a first bearing assembly according to another embodiment.

FIGS. 1A-1C illustrate an embodiment of a first bearing assembly 100. The first bearing assembly 100 may include a first radial-bearing surface 110, which may at least partially engage a corresponding bearing surface of the second bearing assembly, as described below in more detail.

In an embodiment, the first radial-bearing surface 110 may be convex and approximately cylindrical. Furthermore, in some instance, the first radial-bearing surface 110 may be substantially continuous or uninterrupted. Accordingly, rotation of the first radial-bearing surface 110 about an axis 10 may cause the first radial-bearing surface 110 to be in at least partial contact with the opposing bearing surface of the second bearing assembly. Alternatively, however, the first radial-bearing surface 110 may be discontinuous and/or interrupted (e.g., the first radial-bearing surface 110 may include groove).

Additionally, the first radial-bearing surface 110 may include superhard material, such that the first radial-bearing surface 110 may exhibit a hardness that is at least as hard as tungsten carbide. In any of the embodiments disclosed herein, the superhard material may include one or more of polycrystalline diamond, polycrystalline cubic boron nitride, silicon carbide, tungsten carbide, or any combination of the foregoing superhard materials.

For instance, the first bearing assembly 100 may have a superhard body 120 that may include the first radial-bearing surface 110. Particularly, a peripheral surface of the superhard body 120 may form/define the first radial-bearing surface 110. In addition, the superhard body 120 may include a chamfer 121 extending between the first radial-bearing surface 110 and a top surface 122 of the superhard body 120. Under some operating conditions, the chamfer 121 may prevent or eliminate chipping of the superhard body 120 that may, otherwise, affect continuity of the first radial-bearing surface 110.

In an embodiment, the superhard body 120 may be bonded to a substrate 130, which may be secured to a support structure 140. The support structure 140 may have any suitable shape, which may vary from one embodiment to the next. In an embodiment, the support structure 140 may have a generally cylindrical shape. Moreover, the support structure 140 may include multiple sections connected together or integrated with one another, such as sections 141, 142, and 143. Thickness of each section (as measured along the axis 10) as well as the overall thickness of the support structure 140 may vary one embodiment to another, and may depend on a particular application and load experienced by the support structure 140, among other factors or considerations.

Similarly, as mentioned above, the shapes of the sections 141, 142, 143 may vary depending on particular application of the first bearing assembly 100. In some instances, the peripheral surface of the section 141 may have one or more flat or planar portions, which may facilitate engagement of a tool therewith (e.g., a wrench may engage the planar portions (s) in a manner that allows the tool to rotate the support structure 140 about the axis 10). For example the section 141 may be a hexagonal prismoid. Additionally or alternatively, the section 141 may have at least partially cylindrical shape (e.g., in high speed operation a cylindrical shape may improve balance of the first bearing assembly 100 and/or reduce vibration thereof). In any event, a tool may be used to hold and/or assemble the first bearing assembly 100 for operation (e.g., to rotate the first bearing assembly 100 such as to screw the first bearing assembly 100 onto a shaft).

In some embodiments, the sections 142, 143 may have approximately cylindrical shapes. Moreover, in an embodiment, the sections 142 and 143 may have dissimilar diameters and/or thicknesses. For example, the outside diameter of section 142 may be larger than the outside diameter of section 143. Moreover, in some instances, the section 143 may at least partially enter an opening in the second bearing assembly, while the section 142 may be larger than such opening. Likewise, the section 141 may be larger than section 142, such as to provide sufficient surface area for engaging a tool that may be used to secure the first bearing assembly 100 to a shaft (as discussed in greater detail hereinbelow).

Furthermore, in an embodiment, one, some, or all of the sections 141, 142, 143 may be generally concentric with one another. For instance, the sections 141, 142, 143 may be substantially centered about the axis 10. Alternatively, however, some or all of the sections 141, 142, 143 may be off-center relative to one another. In addition, one or more of the sections may include an opening, such as an opening 144 in the section 141, which may accept a shaft and/or a fastener that may secure the first bearing assembly 100 to a machine element or component.

As described above, the first bearing assembly 100 may include the superhard body 120 that may be bonded to the substrate 130. For example, the superhard body 120 may comprise polycrystalline diamond and the substrate 130 may comprise cobalt-cemented tungsten carbide. Other carbide materials may be used with tungsten carbide or as an alternative, such as chromium carbide, tantalum carbide, vanadium carbide, titanium carbide, or combinations thereof cemented with iron, nickel, cobalt, or alloys thereof. Furthermore, in any of the embodiments disclosed herein, the polycrystalline diamond body may be leached to at least partially remove or substantially completely remove a metal-solvent catalyst (e.g., cobalt, iron, nickel, or alloys thereof) that was used to initially sinter precursor diamond particles to form the polycrystalline diamond. In another embodiment, an infiltrant used to re-infiltrate a preformed leached polycrystalline diamond body may be leached or otherwise at least partially removed to a selected depth from a bearing surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond body. Examples of methods for fabricating the superhard bearing elements and superhard materials and/or structures from which the superhard bearing elements may be made are disclosed in U.S. Pat. Nos. 7,866,418; 7,998,573; 8,034,136; and 8,236,074; the disclosure of each of the foregoing patents is incorporated herein, in its entirety, by this reference.

The diamond particles that may be used to fabricate the superhard body 150a in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 μm and 15 μm). According to various embodiments, the diamond particles may include a portion exhibiting a relatively larger size (e.g., 70 μm, 60 μm, 50 μm, 40 μm, 30 μm, 20 μm, 15 μm, 12 μm, 10 μm, 8 μm) and another portion exhibiting at least one relatively smaller size (e.g., 15 μm, 12 μm, 10 μm, 8 μm, 6 μm, 5 μm, 4 μm, 3 μm, 2 μm, 1 μm, 0.5 μm, less than 0.5 μm, 0.1 μm, less than 0.1 μm). In an embodiment, the diamond particles may include a portion exhibiting a relatively larger size between about 10 μm and about 40 μm and another portion exhibiting a relatively smaller size between about 1 μm and 4 μm. In another embodiment, the diamond particles may include a portion exhibiting the relatively larger size between about 15 μm and about 50 μm and another portion exhibiting the relatively smaller size between about 5 μm and about 15 μm. In another embodiment, the relatively larger size diamond particles may have a ratio to the relatively smaller size diamond particles of at least 1.5. In some embodiments, the diamond particles may comprise three or more different sizes (e.g., one relatively larger size and two or more relatively smaller sizes), without limitation. The resulting polycrystalline diamond or superabrasive body formed from HPHT sintering the aforementioned diamond particles may also exhibit the same or similar diamond grain size distributions and/or sizes as the aforementioned diamond particle distributions and particle sizes. Such polycrystalline diamond includes a plurality of diamond grains exhibiting diamond-to-diamond bonding (e.g., $sp^3$ bonding) therebetween and defining interstitial regions having a catalyst therein (e.g., a metal-solvent catalyst or carbonate catalyst). Other superabrasive/superhard materials may include a plurality of superabrasive grains bonded together to define interstitial regions having a catalyst therein. Additionally, in any of the embodiments disclosed herein, the superhard bearing elements may be free-standing (e.g., substrateless) and optionally may be at least partially leached or fully leached to remove a metal-solvent catalyst initially used to sinter the polycrystalline diamond body.

In some embodiments, the substrate 130 may be secured within the support structure 140. For example, the support structure 140 may include a recess 145 that can at least partially accommodate the substrate 130 therein. As such, at least a portion of the substrate 130 may be positioned and secured within the recess 145. In an embodiment, the recess 145 may be generally concentric with the opening 144. Hence, the recess 145 may generally concentrically locate the substrate 130 relative to the opening 144. For instance, the recess 145 may be centered about the axis 10.

Furthermore, the superhard body 120 may be generally concentric within the substrate 130. For example, the first radial-bearing surface 110 of the superhard body 120 may be centered about the axis 10. Thus, in one or more embodiments, the first radial-bearing surface 110 may be generally concentric with the opening 144, such that rotation of the shaft secured within the opening 144 may produce a rotation of the first bearing assembly 100 during which the first radial-bearing surface 110 rotates approximately concentrically within the support structure 140 and/or with the shaft.

In an embodiment, the recess 145 may be approximately cylindrical (i.e., may have an approximately circular cross-section). Likewise, the substrate 130 may have approximately cylindrical cross-section and may have a similar size to the recess 145. For example, the recess 145 may have sufficient clearance to accommodate the substrate 130 therein. The substrate 130 may be brazed, soldered, welded, fastened, press-fit, or otherwise secured to the support structure 140 (e.g., within the recess 145). It should be also appreciated that the recess 145 may have any suitable shape, which may vary from one embodiment to the next. Correspondingly, the substrate 130 also may have any suitable shape that may be mountable inside the recess 145. In any event, the superhard body 120 may be secured to or incorporated with the support structure 140. Thus, rotation of the first bearing assembly 100 may produce a corresponding rotation of the first radial-bearing surface 110, which may be approximately concentrically aligned with the axis of rotation of the shaft.

In some embodiments, the clearance between the recess 145 and the substrate 130 may be substantially small to allow final finishing of the first radial-bearing surface 110 before securing the substrate 130 within the recess 145. Additionally or alternatively, the substrate 130 may be first secured within the recess 145, and the first radial-bearing surface 110 may be finished (e.g., ground) thereafter. Similarly, in an embodiment, the top surface 122 of the superhard body 120 also may be finished after securing the substrate 130 in the recess 145. In an embodiment, the top surface 122 also may be unfinished or may be finished before securing the substrate 130 to the support structure 140.

In some embodiments, the substrate 130 may protrude above a top surface 146 (FIG. 1B) of the support structure 140. Alternatively, the substrate 130 may be entirely within the support structure 140, such that an interface between the substrate 130 and superhard body 120 may be located approximately in plane with top surface 146. In any case, in one or more embodiments, the superhard body 120 may be located entirely above the top surface 146 of the support structure 140. In other embodiments, the superhard body 120 may be partially located in the recess 145.

Referring still to FIG. 1B, in an embodiment, the superhard body 120 may have a thickness 123 (measured from the substrate 130 to the top surface 122) that is similar to or the same as the height of the substrate 130. For example, the thickness of the superhard body 120 may be approximately 0.25 inches, while the thickness of the substrate 130 may be between 0.23 inches to 0.27 inches. Additional examples of suitable thicknesses of the superhard body 120 and/or substrate 130 may include the following: about 0.05 inches to about 0.10 inches; about 0.08 inches to about 0.15 inches; about 0.12 inches to about 0.2 inches; about 0.18 inches to about 0.25 inches; about 0.20 inches to about 0.30 inches; or about 0.25 inches to about 0.50 inches. It should be appreciated that the superhard body 120 and/or substrate 130 may be thicker than 0.50 inches or thinner than 0.08 inches.

It should be appreciated that in some embodiments, the superhard body 120 may be bonded directly to the support structure 140. For example, the support structure 140 may comprise stainless steel and a substrateless superhard body 120 may be brazed, press-fitted, or otherwise attached directly to the support structure 140. Alternatively, the support structure 140 may comprise tungsten carbide, and the superhard body 120 may be bonded to the support structure 140 (e.g., using HPHT process described above). In any event, the first bearing assembly 100 may include the first radial-bearing surface 110, formed/defined by the superhard body 120, which may engage the corresponding second radial-bearing surface of the second bearing assembly.

Moreover, in an embodiment, the first bearing assembly 100 may include a thrust-bearing surface. In particular, the first radial-bearing surface 110 may carry a radial load, thereby preventing or limiting lateral movement of the shaft, for example, relative to the housing, while the thrust-bearing surface may prevent or limit axial movement of the shaft during rotation thereof. For instance, the top surface 146 of the support structure 140 may be a thrust-bearing surface and may engage an opposing or corresponding thrust-bearing surface of the second bearing assembly and/or of another (e.g., third) bearing assembly. Furthermore, the top surface 146 may include superhard material, such as polycrystalline diamond, which may be bonded or otherwise secured thereto.

As noted above, the first bearing assembly may include one or more groves on a bearing surface thereof. For example, as illustrated in FIG. 1C, a first bearing assembly 100a may include a bearing surface 110a formed by a superhard body 120a, which includes a plurality of grooves 111a. Except as otherwise described below, the first bearing assembly 100a and its materials, elements, and components may be similar to or the same as materials, elements, or components of the first bearing assembly 100 (FIGS. 1A and 1B).

In an embodiment, the grooves 111a may be approximately parallel to the axis 10 and may be spaced and arranged thereabout. For instance, the grooves 111a may be evenly spaced about the bearing surface 110a, such that the distance between any two adjacent grooves 111a is the same as the distance between any two other adjacent grooves 111a. It should be appreciated, however, that the bearing surface 110a may include any number of grooves, which may have any suitable size, orientation (e.g., horizontal), configuration (e.g., spiral, arcuate, etc.), and combinations thereof.

Figure 2A:
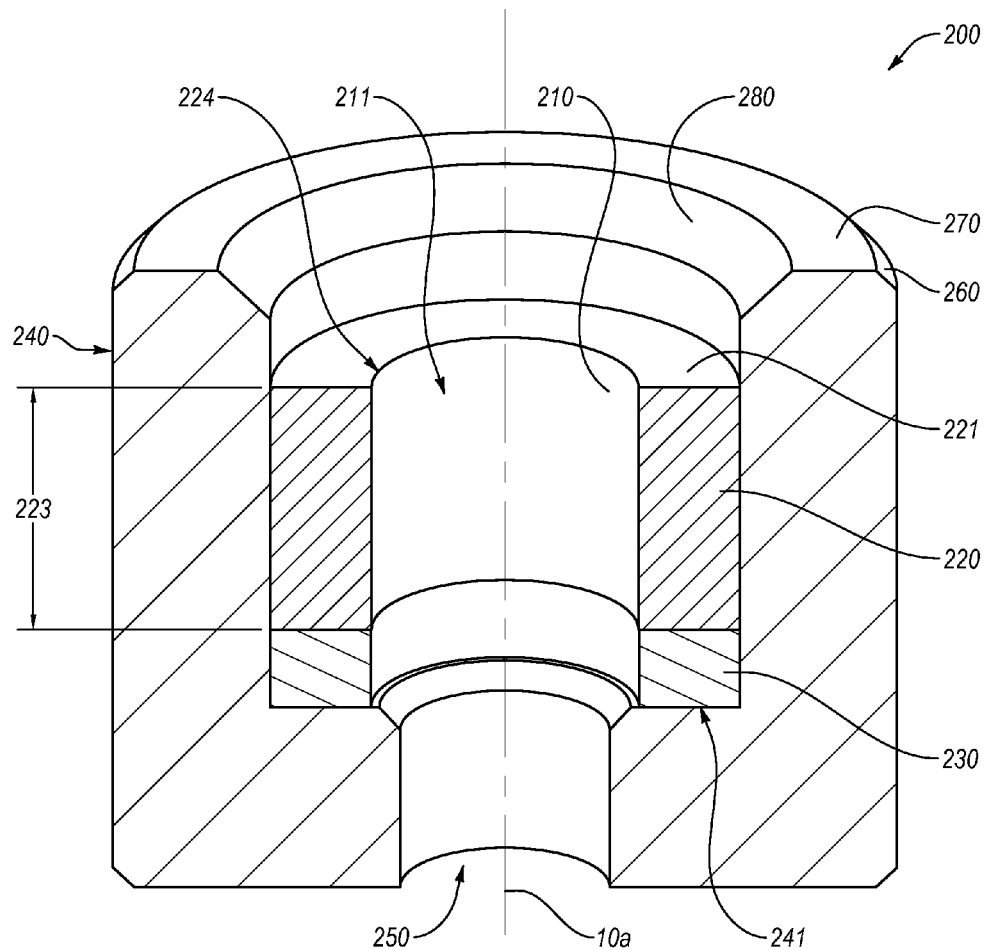
FIG. 2A is a cross-sectional view of a second bearing assembly according to an embodiment.

As mentioned above, the first bearing assembly 100 may rotatably engage the second bearing assembly. FIG. 2A illustrates an embodiment of a second bearing assembly 200. Generally, except as otherwise described below, the second bearing assembly 200 and its materials, elements, and components may be similar to or the same as materials, elements, or components of the first bearing assembly 100 (FIGS. 1A and 1B). In some embodiments, a superhard body 220 and/or a substrate 230 of the second bearing assembly 200 may include materials similar to or the same as the superhard body 120 and substrate 130, respectively. Also, in one example, the second bearing assembly 200 may include a second radial-bearing surface 210, which may engage the first radial-bearing surface 110 (FIGS. 1A and 1B). Embodiments may include the superhard body 220 that may form or define the second radial-bearing surface 210. The superhard body 220 may be bonded to the substrate 230, which may be secured to a support structure 240.

The second radial-bearing surface 210 may have a concave and approximately cylindrical shape that may span about an axis 10a in a manner that defines an opening in the second bearing assembly 200. Particularly, the cylindrical shape of the second radial-bearing surface 210 may at least partially engage the corresponding first radial-bearing surface of the first bearing assembly. In other words, the protruding superhard body that may form/define the first radial-bearing surface may be positioned at least partially within an opening 211 in the second bearing assembly 200 and the first radial-bearing surface may at least partially contact the second radial-bearing surface 210. In some instances, the opening 211 may have an approximately cylindrical shape, such as to define an inside diameter 224.

When at least partially engaged, the first radial-bearing surface and the second radial-bearing surface 210 may be substantially concentric with each other, such that the axis 10a is generally aligned with the axis 10 (FIGS. 1A and 1B). In any event, the first radial-bearing surface 110 (FIGS. 1A and 1B) may at least partially contact the second radial-bearing surface 210, such that the second bearing assembly 200 and the first bearing assembly may rotate relative to each other with limited relative lateral movement. In some embodiments, the second radial-bearing surface 210 may be substantially continuous. Alternatively, the second radial-bearing surface 210 may have groves or other interruptions (e.g., to supply fluid between the second radial-bearing surface 210 and the first radial-bearing surface).

In an embodiment, the support structure 240 may have an approximately cylindrical shape. Furthermore, the support structure 240 may include a recess 241 that may secure the superhard body 220 and/or the substrate 230 therein. The superhard body 220 and/or substrate 230 may be press-fitted, brazed, fastened, or otherwise secured in the recess 241. Moreover, the second bearing assembly 200 may include the superhard body 220 that is substrateless, which may be bonded or otherwise secured directly to the support structure 240. In any event, the superhard body 220 may be secured to the support structure 240 and may have a suitable shape and size that may allow the first radial-bearing surface to at least partially enter the opening 211 formed in the superhard body 220 as well as at least partially contact the second radial-bearing surface 210. In another embodiment, the substrate 230 may be an annular substrate (e.g., ring-shaped) that is attached to the support structure 240 and the superhard body 220 may be received by and bonded with the annular substrate.

As shown in FIG. 2A, the second bearing assembly 200 may include a through hole 250. In some instances, the through hole 250 may allow fluid (e.g., drilling fluid) to enter and/or exit the second bearing assembly 200. For instance, the through hole 250 may be in fluid communication with the opening 211 defined by the second radial-bearing surface 210. Furthermore, any debris or dust generated during operation of the second bearing assembly 200 and the first bearing assembly may exit through the through hole 250, which may reduce wear of the second radial-bearing surface 210 and/or of the first radial-bearing surface. Moreover, the through hole 250 may include a female thread, which may be accept a fastener that may secure the second bearing assembly 200 to a machine element or component.

In some instances, the second bearing assembly 200 may include a chamfer 260 extending between a peripheral surface thereof and a top surface 270. Additionally or alternatively, the second bearing assembly 200 may include a second chamfer or lead-in 280, which may extend between the top surface 270 and a peripheral surface of the recess 241. The chamfer 260 and/or lead-in 280 may reduce or eliminate chipping or breaking of otherwise sharp corners or edges of the second bearing assembly 200.

In an embodiment, the top surface of the superhard body 220 also may form/define a thrust-bearing surface 221, which may at least partially contact the thrust-bearing surface of the first bearing assembly to limit or prevent relative axial movement of the first and second bearing assemblies. Hence, in one or more embodiments, the thrust-bearing surface 221 may include superhard material, such as polycrystalline diamond.

Figure 2B:
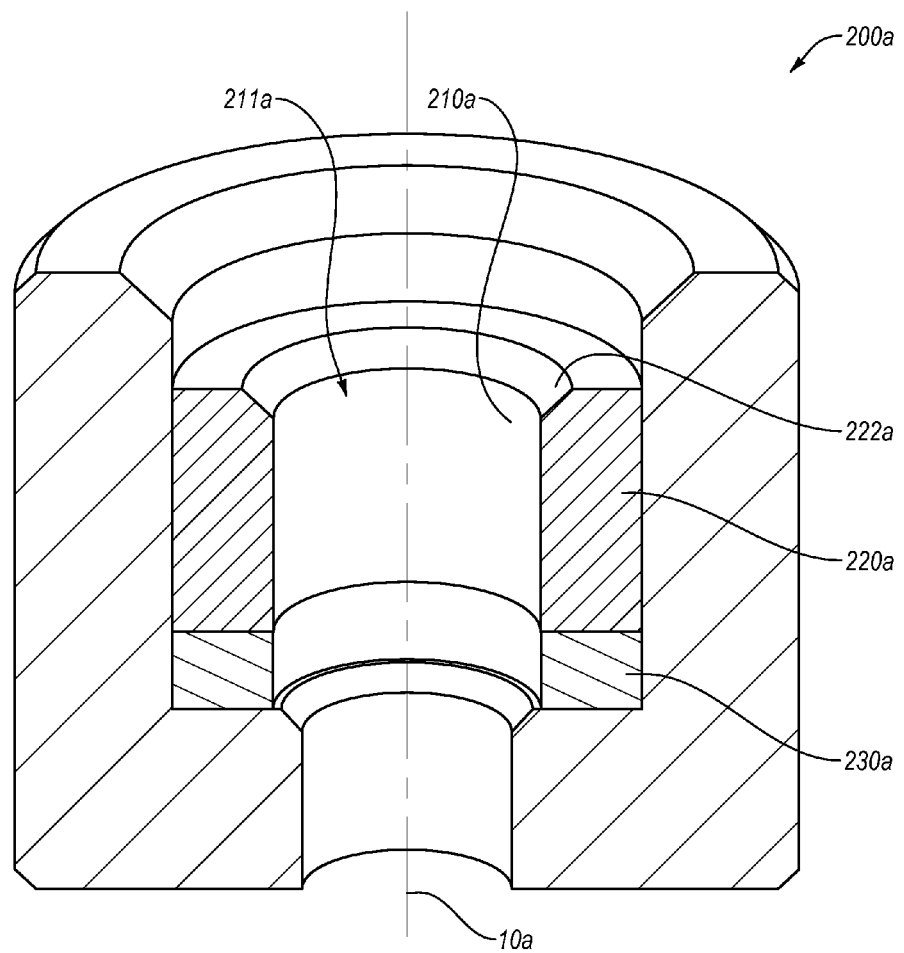
FIG. 2B is a cross-sectional view of a second bearing assembly according to another embodiment.

In some embodiments, the superhard body may include a chamfer to prevent chipping or cracking thereof during assembly and/or operation. For instance, FIG. 2B illustrates a second bearing assembly 200a that includes a superhard body 220a, which has a bearing surface 210a, and which may be bonded to a substrate 230a. Except as otherwise described herein, the second bearing assembly 200a and its materials, elements, and components may be similar to or the same as materials, elements, or components of the second bearing assembly 200 (FIG. 2A). In an embodiment, the superhard body 220a may include a chamfer 222a, which may be positioned at the top of an opening 211a defined by the bearing surface 210a.

Figure 2C:
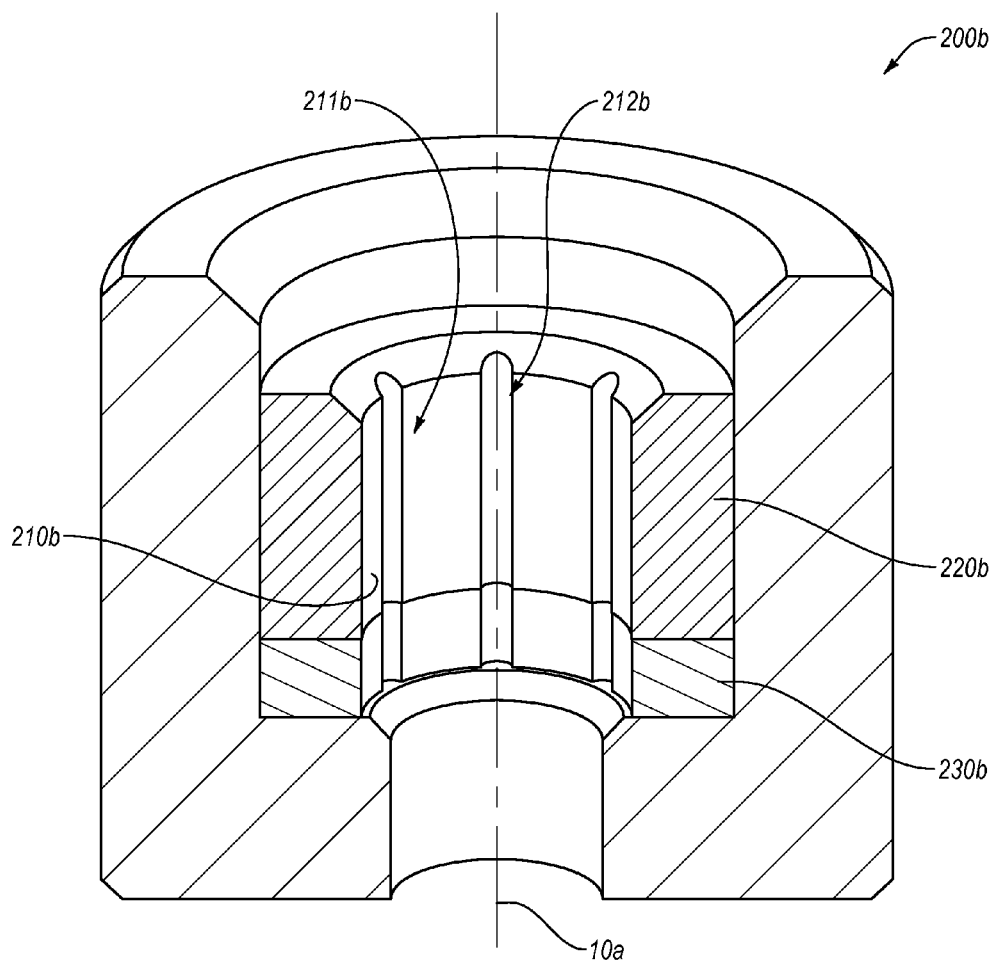
FIG. 2C is a cross-sectional view of a second bearing assembly according to yet another embodiment.

In additional or alternative embodiments, the second bearing assembly may include grooves, which may be similar to or the same as the grooves of the first bearing assembly. For example, FIG. 2C illustrates a second bearing assembly 200b that has a superhard body 220b that forms or defines a bearing surface 210a, and which includes a plurality of grooves 212b. Except as otherwise described herein, the second bearing assembly 200b and its materials, elements, and components may be similar to or the same as materials, elements, or components of any of the second bearing assemblies 200, 200a (FIGS. 2A and 2B). In some embodiments, the grooves 212b may extend into and through a substrate 230b. Accordingly, for example, fluid may flow through the groove 212b and into and/or out of an opening 211b of the second bearing assembly 200b. Moreover, it should be appreciated, however, that the bearing surface 210b may include any number of grooves, which may have any suitable size, orientation (e.g., horizontal), configuration (e.g., spiral, arcuate, etc.), and combinations thereof.

Figure 3A:
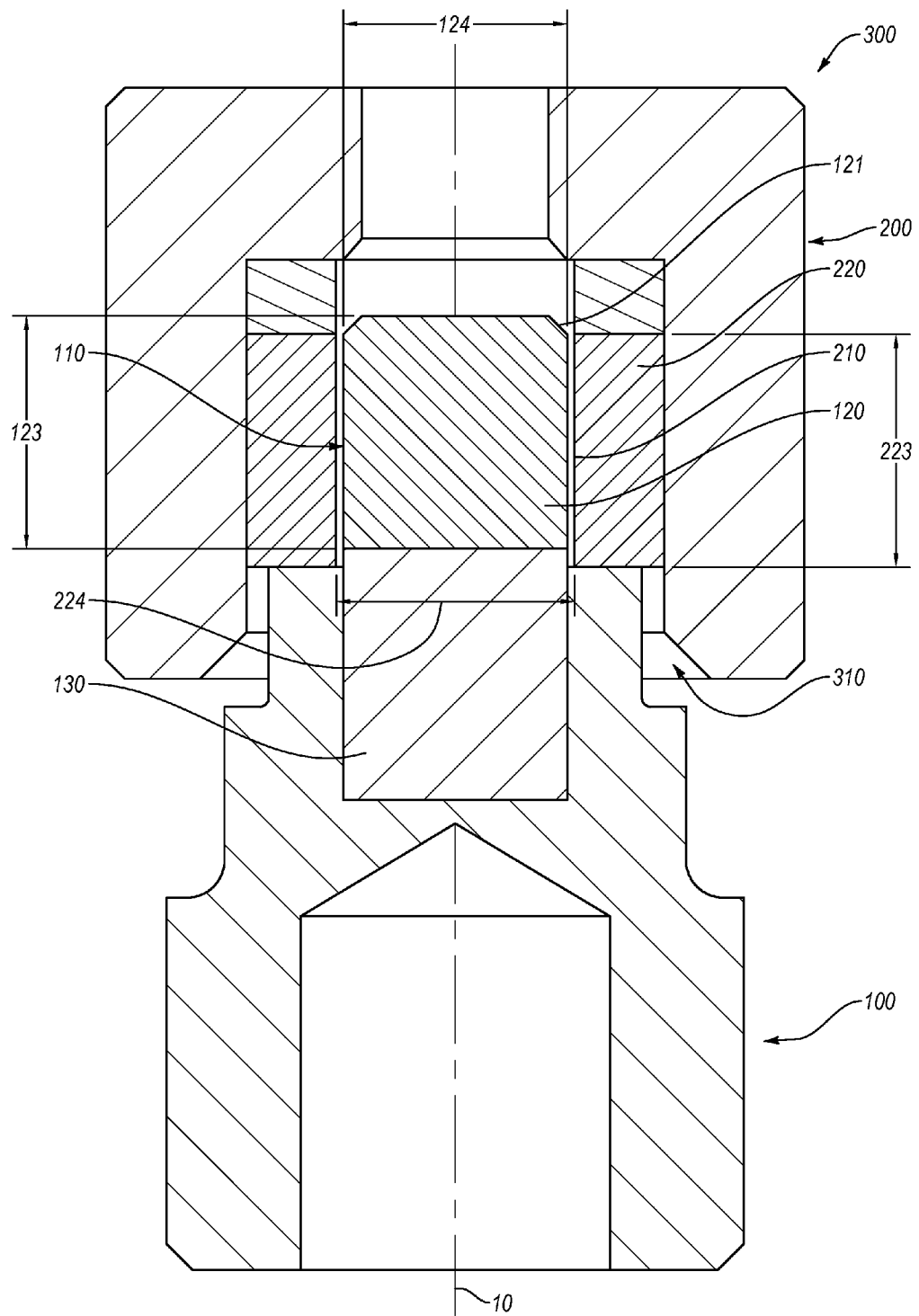
FIG. 3A is a cross-sectional view of a bearing apparatus according to an embodiment.

As noted above, the first and second bearing assemblies rotate with respect to one another, wherein the first radial-bearing surface and the second radial-bearing surface 210 at least partially contact one another. FIG. 3A illustrates an embodiment of a bearing apparatus 300 that includes the first bearing assembly 100 and second bearing assembly 200 assembled with one another. In some embodiments, the first bearing assembly 100 may be a rotor, while the second bearing assembly 200 may be a stator. Alternatively, the first bearing assembly 100 may be a stator, while the second bearing assembly 200 may be a rotor (e.g., the second bearing assembly 200 may be attached to the shaft). Furthermore, in an embodiment, both the first bearing assembly 100 and the second bearing assembly 200 may rotate relative to a machine or mechanism incorporating the bearing apparatus 300. In any case, the first bearing assembly 100 and second bearing assembly 200 may rotate relative to one another.

Particularly, the superhard body 120 may be positioned at least partially within the opening in the second bearing assembly 200 defined by the superhard body 220. As mentioned above, the superhard body 220 and the superhard body 120 may at least partially contact one another, thereby providing a rotatable bearing between the first bearing assembly 100 and the second bearing assembly 200. In some embodiments, diameter 124 of the superhard body 120 may be sufficiently small to accommodate compact spaces. For instance, the diameter 124 of the superhard body 120 may be in one or more of the following ranges: about 0.08 inches to 0.15 inches; about 0.10 inches to 0.20 inches; about 0.18 inches to about 0.38 inches; about 0.30 inches to 0.50 inches; about 0.40 inches to 0.80 inches; less than 2 inches; or less than 1 inch. In some instances, the diameter 124 of the superhard body 120 may be smaller than 0.08 inches or greater than 0.80 inches.

Similarly, the superhard body 120 may have a suitable thickness 123, which may vary from one embodiment to another. For example, the thickness 123 of the superhard body 120 may be in one or more of the following ranges: about 0.05 inches to about 0.09 inches; about 0.08 inches to about 0.12 inches; about 0.09 inches to about 0.15 inches; about 0.15 inches to about 0.25 inches; less than 0.15 inches; less than 0.20 inches; or less than 0.50 inches. It should be appreciated that in some embodiments, the thickness 123 may be less than 0.05 inches or greater than 0.50 inches.

As mentioned above, the second radial-bearing surface 210 may define an opening that is sufficiently shaped and sized to accept and at least partially contact the first radial-bearing surface 110 during operation (e.g., the opening may have the diameter 224). Furthermore, in some embodiments, the bearing apparatus 300 may include a clearance or a gap between the first radial-bearing surface 110 and the second radial-bearing surface 210 (measured by the difference between the outside diameter defined by the first radial-bearing surface 110 and inside diameter defined by the second radial-bearing surface 210). For example, the gap between the first radial-bearing surface 110 and the second radial-bearing surface 210 may be in one or more of the following ranges (provided as a percentage of the diameter defined by the first radial-bearing surface 110): about 0.5% to 1.0%; about 0.8% to 1.5%; about 1.2% to 2.5%; about 2% to 3%; or about 2.7% to 3.5%. In some instances, the gap between the first radial-bearing surface 110 and the second radial-bearing surface 210 may be less than 0.5% or greater than 3.5% of the diameter defined by the first radial-bearing surface 110. In a specific embodiment, the first radial-bearing surface 110 may define an outside diameter of about 0.249 inches, while the second radial-bearing surface 210 may define an inside diameter of about 0.256 inches, forming a gap of about 0.007 inches.

Although the gap of about 0.007 inches may be atypical for radial bearing assemblies, such gap may facilitate development of fluid film between the first radial-bearing surface 110 and the second radial-bearing surface 210, thereby producing a hydrodynamic operation of the bearing apparatus 300. In some instances, the fluid may be introduced between the first radial-bearing surface 110 and the second radial-bearing surface 210 through a space 310 between the first bearing assembly 100 and the second bearing assembly 200. Alternatively, the fluid may be introduced through the through hole 250 in the second bearing assembly 200. It should be also appreciated that the fluid may be introduced between the first radial-bearing surface 110 and second radial-bearing surface 210 in any number of suitable ways, which may vary from one embodiment to the next. Additionally, in some embodiments the drilling fluid may be channeled to enter the space between the first radial-bearing surface 110 and second radial-bearing surface 210 and may form the fluid film, which may facilitate hydrodynamic operation of the bearing apparatus 300.

In some embodiments, a portion of the substrate 130 may be positioned at least partially within the opening defined by the second radial-bearing surface 210. Alternatively, the substrate 130 may be outside of or above the opening formed by the second radial-bearing surface 210 and may not contact the second radial-bearing surface 210 during operation of the bearing apparatus 300. Accordingly, the substrate 130 may not experience wear during operation of the bearing apparatus 300.

In addition, as mentioned above, the chamfer 121 may prevent the superhard body 120 from chipping and/or cracking during the operation of the bearing apparatus 300. Moreover, in some embodiments, the chamfer 121 may start below the second radial-bearing surface 210. As such, in some embodiments, the entire first radial-bearing surface 110 may be in contact with the second radial-bearing surface 210.

Figure 3B:
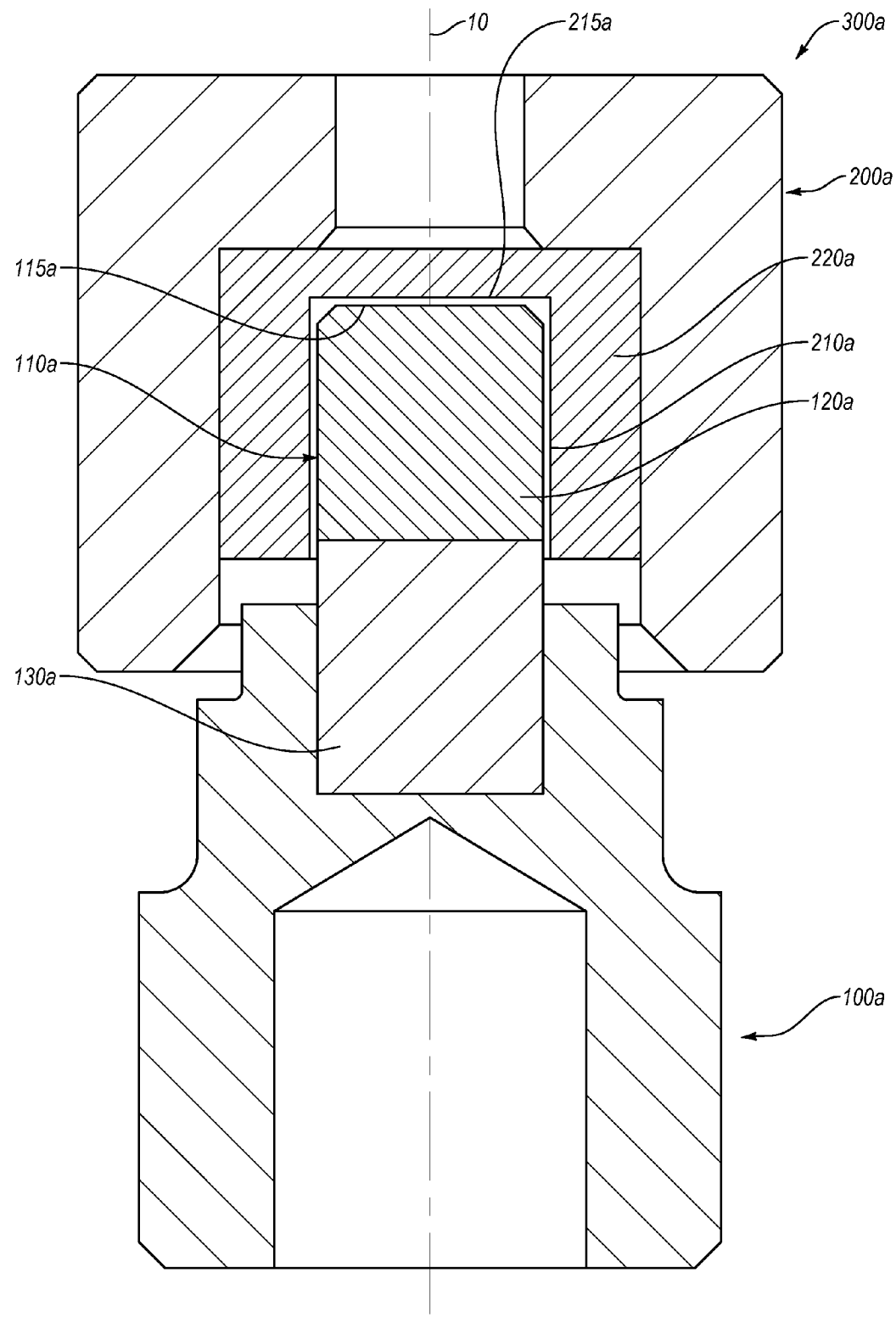
FIG. 3B is a cross-sectional view of a bearing apparatus according to another embodiment.

In some embodiments, the bearing apparatus may carry both a radial load and a thrust load. For instance, as illustrated in FIG. 3B, a bearing apparatus 300a may include opposing thrust-bearing surfaces 115a, 215a of first and second bearing assemblies 100a, 200a. Except as otherwise described herein, materials, elements, or components of the bearing apparatus 300a may be similar to or the same as materials, elements, or components of the bearing apparatus 300 (FIG. 3A). For instance, the first and second bearing assemblies 100a, 200a also may include radial bearing surfaces 110a, 210a that may carry the radial load exerted onto the bearing apparatus 300a.

Moreover, in an embodiment, both the thrust-bearing surface 115a and the radial bearing surface 110a may be formed by the same superhard body 120a of the first bearing assembly 100a. In an embodiment, the superhard body 120a may be bonded to a substrate 130a. The thrust-bearing surface 215a and the radial bearing surface 210a of the second bearing assembly 200a may be formed/defined by a superhard body 220a. In some instance, the superhard body 220a may be bonded directly to a support structure 240.

Figure 3C:
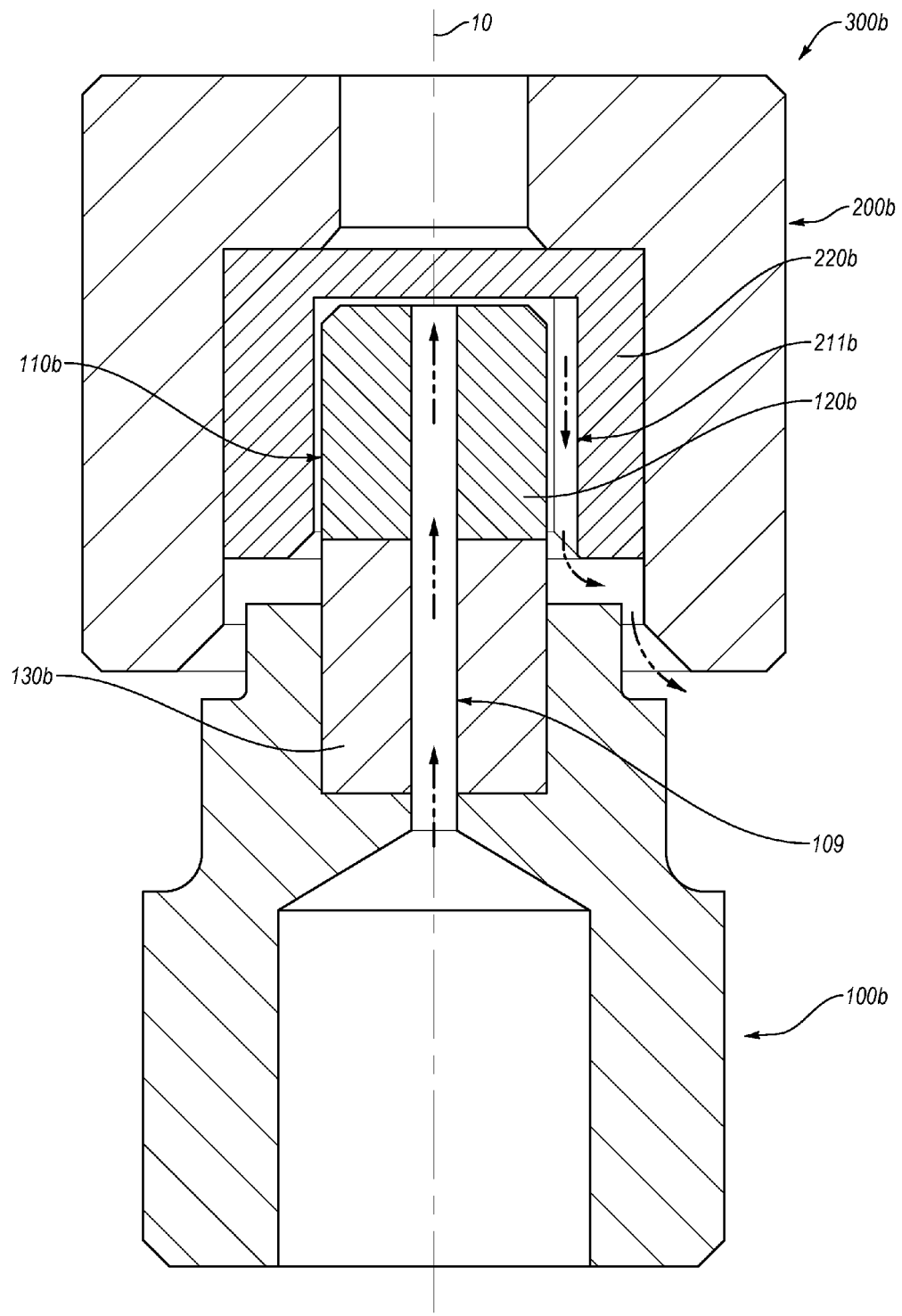
FIG. 3C is a cross-sectional view of a bearing apparatus according to yet another embodiment.

As noted above, bearing surfaces of the first and/or second bearing assembly may include one or more grooves therein. For example, FIG. 3C illustrates a bearing apparatus 300b that includes a first bearing assembly 100b and a second bearing assembly 200b, either or both of which may include grooves in the bearing surfaces thereof. In particular, an embodiment includes grooves 211b in a superhard body 220b of the second bearing assembly 200b. It should be also appreciated that, in one or more embodiments, the first bearing assembly 100b also may include grooves in the bearing surface thereof (e.g., as described above in connection with FIG. 1C).

In any event, fluid may be circulated through one or more grooves in the bearing surfaces of the second bearing assembly 200b and/or in the first bearing assembly 100b. Providing fluid flow through the grooves 211b may produce hydrodynamic operation of the bearing apparatus 300b. For example, the fluid may be directed through the first bearing assembly 100b and into the second bearing assembly 200b (e.g., into the grooves 211b of the second bearing assembly 200b). In an embodiment, the first bearing assembly 100b may include an opening 109, which may pass through the first bearing assembly 100b (e.g., through substrate 130b and/or through superhard body 120b of the first bearing assembly 100b). Particularly, the opening 109 may be in fluid communication with the grooves 211b, and the fluid may pass through the opening 109 and into the grooves 211b.

Figure 3D:
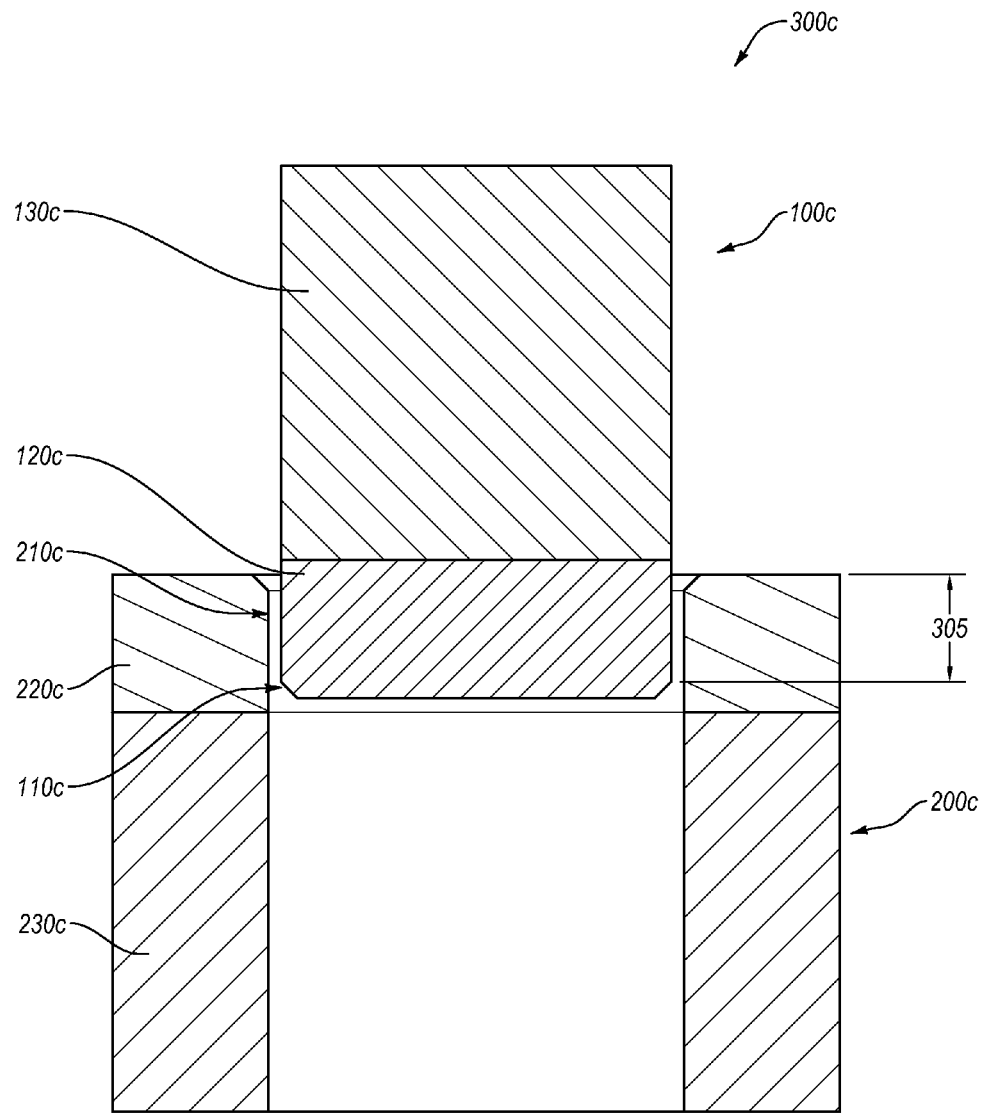
FIG. 3D is a cross-sectional view of a bearing apparatus according to still one other embodiment.

While the bearing assemblies and bearing apparatuses described above may include support structures, it should be appreciated that this invention is not so limited. For instance, FIG. 3D illustrates an embodiment of a bearing apparatus 300c that includes a first bearing assembly 100c and a second bearing assembly 200c assembled with one another, either or both of which may not include a support structure. Except as described herein, material, elements, or components of the bearing apparatus 300c may be similar to or the same as materials, elements, or components of any of the bearing apparatuses 300, 300a, 300b (FIGS. 3A-3C).

In some embodiments, the first bearing assembly 100c may include a superhard body 120c bonded to a substrate 130c, which may be substantially cylindrical. The first bearing assembly 100c may be secured to or otherwise incorporated directly into moving (e.g., rotating) or stationary machine component. Likewise, the second bearing assembly 200c may include a hollow cylindrical or tubular superhard body 220c that may be bonded to a substrate 230c. In some instances, the substrate 230 also may be at least partially tubular. The second bearing assembly 200c also may be directly attached to or incorporated into a moving (e.g., rotating) or stationary machine component. In any event, at least a portion of the superhard body 120c may enter the opening in the superhard body 220c.

Moreover, a bearing surface 110c of the first bearing assembly 100c may engage a corresponding bearing surface 210c of the second bearing assembly 200c. For example, the bearing surfaces 110c and 210c may have an overlap 305 therebetween. In other words, the bearing surfaces 110c and 210c may engage or at least partially contact each other along the overlap 305. For example, the overlap 305 may be greater than or less than 0.50 inches, such as 0.3 inches to about 0.7 inches, 0.2 inches to about 0.35 inches, or about 0.15 inches to about 0.30 inches.

Figure 4:
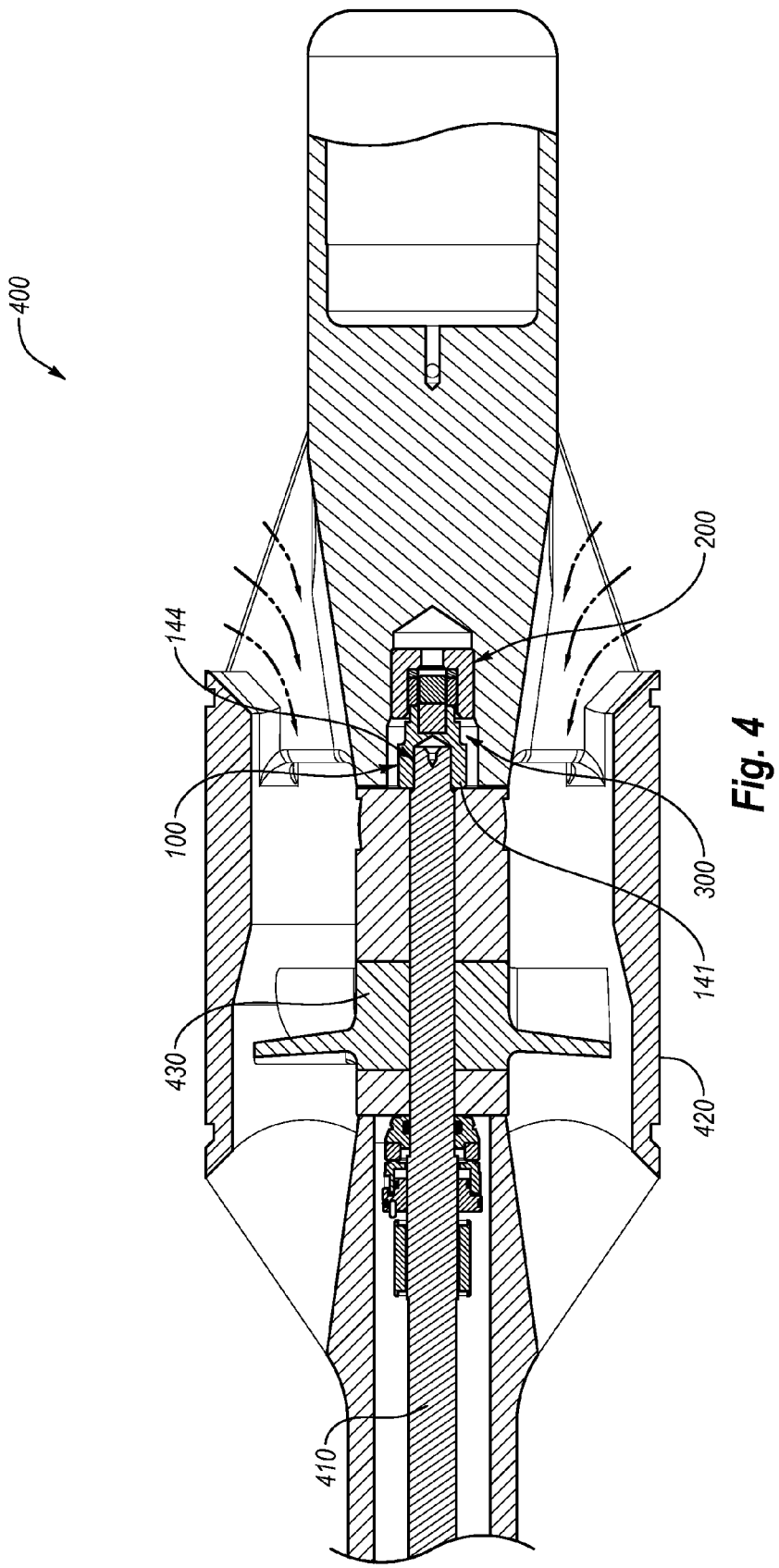
FIG. 4 is a partial cross-sectional view of a power generation unit according to an embodiment.

The bearing apparatus 300 or any other bearing apparatus disclosed herein may be incorporated into any number of machines or mechanisms to rotatably secure rotating components or elements thereof. FIG. 4 illustrates an embodiment of a power generation unit 400 that includes the bearing apparatus 300. In particular, the bearing apparatus 300 may rotatably connect a shaft 410 within a housing 420. For example, the second bearing assembly 200 may be a stator and may be secured to and/or within the housing 420, such as to remain substantially stationary relative to the housing 420. The first bearing assembly 100 may be a rotor and may be secured to the shaft 410 in a manner that allows the housing 420 to rotate within the shaft 410. In an embodiment, the shaft 410 may be secured within the section 141.

It should be appreciated that the first bearing assembly 100 may be attached to the shaft 410 in any number of suitable ways. In an embodiment, as noted above, the section 141 includes the opening 144 that may accept a portion of the shaft 410. Moreover, the opening 144 may position the first bearing assembly 100 relative to the shaft 410. For example, the opening 144 may align the first bearing assembly 100 relative to the shaft 410, such that the first bearing assembly 100 is concentric with the shaft 410. Accordingly, rotation of the shaft 410 about center axis there may produce rotation of the first bearing assembly 100 about the axis 10.

Furthermore, the shaft 410 may be secured within the opening 144. For example, the opening 144 may include female threads that may engage with male threads on an end of the shaft 410, thereby connecting the first bearing assembly 100 to the shaft 410. In some instances, the threads also may align the first bearing assembly 100 relative to the shaft, such that the first bearing assembly 100 is concentric with the shaft 410. Other fastening configurations (e.g., with screws) also may connect the first bearing assembly 100 to the shaft 410. In additional or alternative embodiments, the shaft 410 may be press-fitted into the opening 144 of the first bearing assembly 100. Likewise, the first bearing assembly 100 may be brazed, welded, or otherwise connected to or integrated with the shaft 410 (e.g., the support structure 140 of the first bearing assembly 100 may be integrated with the shaft 410). In any event, the first bearing assembly 100 may be attached or secured to the shaft 410 in a manner that rotation of the shaft 410 produces a corresponding rotation of the first bearing assembly 100 and vice versa.

The term "housing" is not intended to be limiting and is provided only as an example component of the power generation unit 400. It should be appreciated that the shaft may be rotatably connected to any element or component of a machine that may remain stationary relative to the shaft during operation of such machine. In other words, the housing 420 may be any other stationary element or component that may secure a stator of the bearing apparatus 300, which may be rotatably engaged with a rotor of the bearing apparatus 300.

In an embodiment, the power generation unit 400 may include a turbine 430 attached to the shaft 410. As fluid flows through the power generation unit 400 (as indicated by the arrows), the turbine 430 may be induced to rotate together with the shaft 410. In an embodiment, the housing 420 may include one or more openings, which may channel the fluid toward the turbine 430 and, subsequently, out of the power generation unit 400. The shaft 410 may be operably connected to an alternator in a manner that rotation of the shaft 410 may drive the alternator (e.g., the shaft 410 may include a magnetic rotor that may be surrounded by windings), thereby converting mechanical energy into electrical power. Additionally, a portion of the fluid may be diverted or may otherwise flow between the first bearing assembly 100 and second bearing assembly 200, as described above, thereby producing hydrodynamic operation of the bearing apparatus 300.

It should be appreciated that any of the bearing apparatuses 300, 300a, 300b, 300c (FIGS. 3A-3D) may be used in the power generation unit described above. Furthermore, even though the bearing apparatuses are described above as used in a power generation unit (e.g., in the power generation unit 400), the embodiments of the invention are not so limited. Hence, any of the bearing apparatuses 300, 300a, 300b, 300c (FIGS. 3A-3D) may be used in any suitable machine or mechanism to facilitate rotation of one or more elements or components thereof. For instance, any of the bearing apparatuses 300, 300a, 300b, 300c (FIGS. 3A-3D) may be used a blood pump, such as a cardiopulmonary bypass blood pump described in U.S. patent application Ser. No. 13/761,944, entitled "Bearing Assembly For Use In Axial-Flow Cardiopulmonary Bypass Blood Pumps And Related Pumps," filed on Feb. 7, 2013, the entire content of which is incorporated herein by this reference. For instance, any of the bearing apparatuses 300, 300a, 300b, 300c (FIGS. 3A-3D) may rotatably secure the shaft of the blood pump within and relative to the housing thereof.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

I claim:

1. A bearing apparatus, comprising:
    a first bearing assembly including:
        a first support structure including a first recess;
        a first substrate secured to the first support structure within the first recess; and
        a first polycrystalline diamond body bonded to the first substrate at a bonding interface and protruding outward from the first support structure, the first polycrystalline diamond body including bonded diamond grains that define a convex radial-bearing surface, a top surface, and a volume enclosed by the convex bearing surface, the top surface, and the bonding interface, wherein the first bearing assembly includes one or more first thrust-bearing surfaces, and the top surface defines at least one of the one or more first thrust-bearing surfaces; and
    a second bearing assembly including a second polycrystalline diamond body including bonded diamond grains and defining a concave radial-bearing surface that is sized and configured to be positioned to at least partially contact the convex radial-bearing surface, the second polycrystalline diamond body defining one or more second thrust bearing surfaces positioned and configured to engage the one or more first thrust-bearing surfaces during use.

2. The bearing apparatus of claim 1, wherein the second polycrystalline diamond body is bonded to a substrate.

3. The bearing apparatus of claim 1, wherein the first radial-bearing surface is substantially continuous.

4. The bearing apparatus of claim 1, wherein the second radial-bearing surface is substantially continuous.

5. The bearing apparatus of claim 1, wherein the first radial-bearing surface defines an outside diameter, the second radial-bearing surface defines an inside diameter, and a gap defined by the difference between the outside diameter and the inside diameter is about 2% to about 3% of the first outside diameter.

6. The bearing apparatus of claim 1, wherein the first polycrystalline diamond body includes a chamfer extending between the convex radial-bearing surface and a top surface of the polycrystalline diamond body.

7. The bearing apparatus of claim 1, wherein the convex radial-bearing surface is substantially cylindrical and the concave radial-bearing surface is substantially cylindrical.

8. The bearing apparatus of claim 7, wherein one or more of the convex radial-bearing surface or the concave radial-bearing surface includes one or more grooves recessed therein.

9. The bearing apparatus of claim 1, wherein one or more of the first polycrystalline diamond body or the second polycrystalline diamond body has a thickness that is less than 0.50 inches.

10. The bearing apparatus of claim 1, wherein the convex radial-bearing surface and the concave radial-bearing surface overlap by less than 0.50 inches.

11. The bearing apparatus of claim 1, wherein the concave radial-bearing surface of the second polycrystalline diamond body defines an opening, and the second bearing assembly includes a conduit in fluid communication with the opening.

12. The bearing apparatus of claim 1 wherein the second polycrystalline diamond body includes a surface that circumscribes an opening at least partially defined by the concave radial-bearing surface and which defines one of the one or more second thrust-bearing surfaces.

13. The bearing apparatus of claim 1 wherein the concave radial-bearing surface of the second polycrystalline diamond body defines an opening, and the second polycrystalline diamond body is unitary and includes a bottom surface defining a bottom of the opening in the second unitary polycrystalline diamond body, and the bottom surfaces defines one of the one or more second thrust-bearing surface.

14. An assembly, comprising:
a housing;
a first bearing assembly attached to the housing, the first radial bearing assembly including a first unitary superabrasive body including bonded superabrasive grains and defining a convex radial-bearing surface and a top surface, the first bearing assembly including one or more first thrust-bearing surfaces, at least one of the one or more first thrust-bearing surfaces being defined by the top surface;
a shaft rotatably secured within the housing; and
a second bearing assembly attached to the shaft, the second bearing assembly including a second unitary superabrasive body including bonded superabrasive grains and defining a concave radial-bearing surface, the concave radial-bearing surface being positioned to at least partially contact the first radial-bearing surface when the shaft rotates, the second unitary superabrasive body defining one or more second thrust-bearing surfaces positioned to engage the one or more first thrust-bearing surfaces when the shaft rotates.

15. The assembly of claim 14, further comprising a turbine connected to the shaft in a manner that flow of fluid through the turbine produces rotation of the shaft.

16. The assembly of claim 14, wherein the second bearing assembly includes a blind opening defined by the concave radial-bearing surface and by a bottom surface, the one or more second bearing-surfaces including the bottom surface.

17. The assembly of claim 16, wherein the first unitary body of bonded diamond grains protrudes into the opening defined by the concave radial-bearing surface.

18. The assembly of claim 17, wherein the concave radial-bearing surface is substantially cylindrical and has an outside diameter about 0.23 inches to about 0.27 inches.

19. The assembly of claim 17, wherein the convex radial-bearing surface is substantially cylindrical and has an inside diameter about 0.23 inches to about 0.27 inches.

20. The assembly of claim 14, further comprising:
a first carbide substrate secured to a first support structure of the first bearing assembly, the first unitary superabrasive body being bonded to the first carbide substrate; and
a second carbide substrate secured to a second support structure of the second bearing assembly, the second unitary body of bonded diamond grains being bonded to the second carbide substrate.

21. The assembly of claim 20, wherein one or more of the first carbide substrate is secured within a first recess of the first support structure or the second carbide substrate is secured within a recess of the second support structure.

22. The assembly of claim 14, wherein one or more of the unitary body of bonded diamond grains and the another unitary body of bonded diamond grains have a thickness of less than 0.50 inches.

23. The assembly of claim 14, the convex bearing surface and the concave bearing surface overlap by less than 0.50 inches.

* * * * *